(12) United States Patent
Shpak

(10) Patent No.: US 6,799,054 B2
(45) Date of Patent: Sep. 28, 2004

(54) COLLABORATION BETWEEN WIRELESS LAN ACCESS POINTS USING WIRED LAN INFRASTRUCTURE

(75) Inventor: Eran Shpak, Tel Aviv (IL)

(73) Assignee: Extricom, Ltd. (IL)

( * ) Notice: Subject to any disclaimer, the term of this patent is extended or adjusted under 35 U.S.C. 154(b) by 103 days.

(21) Appl. No.: 10/272,686

(22) Filed: Oct. 17, 2002

(65) Prior Publication Data

US 2003/0207698 A1 Nov. 6, 2003

Related U.S. Application Data

(63) Continuation-in-part of application No. 10/214,271, filed on Aug. 7, 2002.
(60) Provisional application No. 60/377,650, filed on May 6, 2002.

(51) Int. Cl.[7] .................................................. H04Q 7/00
(52) U.S. Cl. ...................... 455/525; 455/515; 455/526; 370/338; 370/445; 370/469; 370/462; 370/322
(58) Field of Search ................................. 455/525, 526, 455/515; 370/338, 445, 469, 462, 322, 346, 347, 461; 340/3.51

(56) References Cited

U.S. PATENT DOCUMENTS

| | | | |
|---|---|---|---|
| 6,529,164 B1 | 3/2003 | Carter | |
| 6,671,284 B1 * | 12/2003 | Yonge et al. | 370/462 |
| 6,674,403 B2 | 1/2004 | Gray et al. | |
| 2002/0114303 A1 * | 8/2002 | Crosbie et al. | 370/338 |
| 2003/0063593 A1 | 4/2003 | Koyanagi et al. | |
| 2003/0133422 A1 * | 7/2003 | Bims | 370/328 |

OTHER PUBLICATIONS

ANSI/IEEE Standard 80 211 (1999 Edition), Part 11: Wireless LAN Medium Access Control (MAC) and Physical Layer (PHY) Specifications.

U.S. patent application No.: 10/214,271, filed Aug. 7, 2002, entitled: "Collaboration Between Wireless LAN Access Points".

* cited by examiner

Primary Examiner—Nick Corsaro
Assistant Examiner—Alan T. Gantt
(74) Attorney, Agent, or Firm—Welsh & Katz, Ltd.

(57) ABSTRACT

A method for mobile communication includes arranging a plurality of access points in a wireless local area network (WLAN) to communicate on a common frequency channel with a mobile station, and linking the access points together by cables in a wired local area network (LAN). When one or more of the access points receive an uplink signal transmitted over the WLAN by the mobile station on the common frequency channel, the access points send messages over the LAN and arbitrate among themselves based on the messages so as to select one of the access points to respond to the uplink signal.

23 Claims, 4 Drawing Sheets

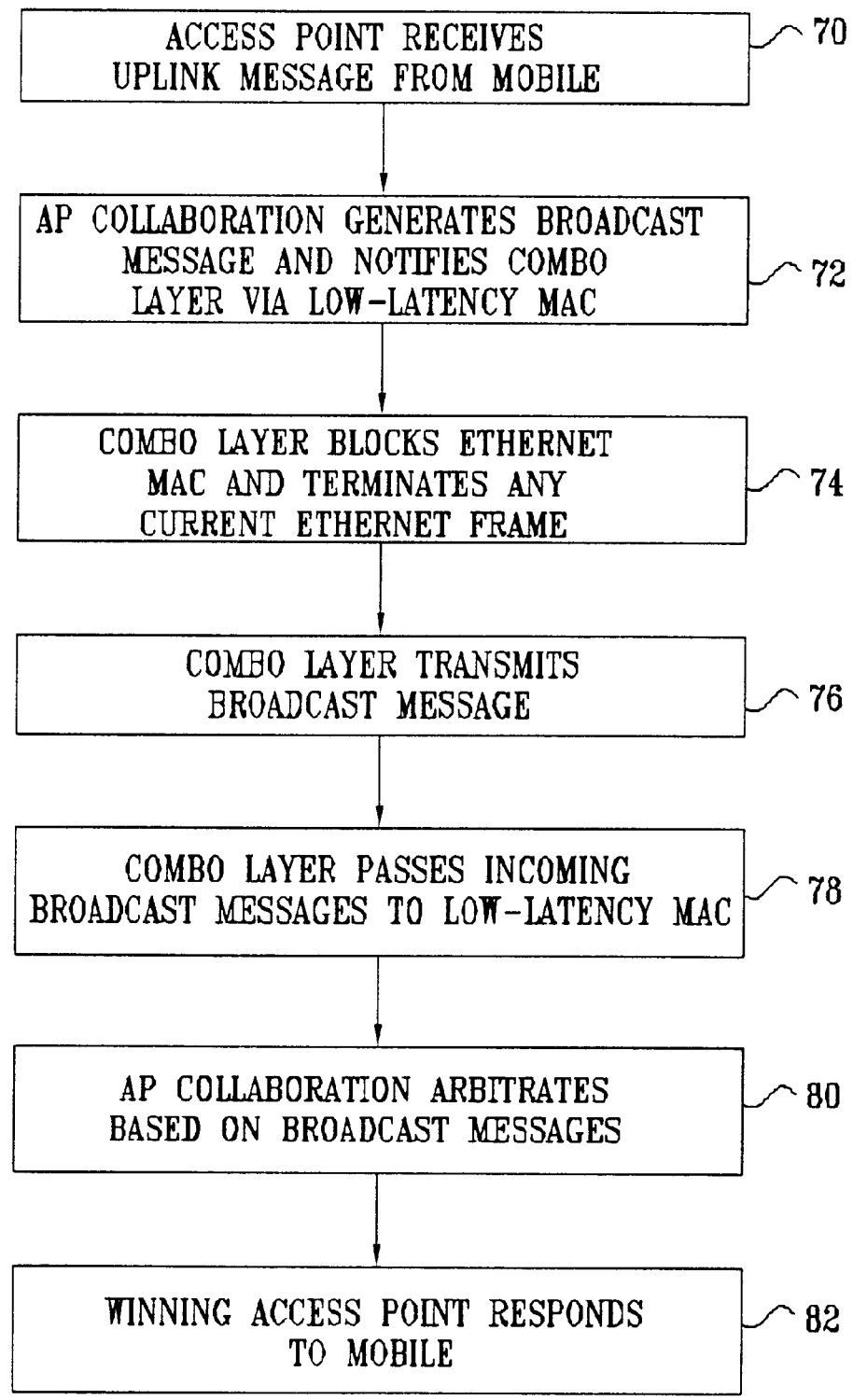

COLLABORATION BETWEEN WIRELESS LAN ACCESS POINTS USING WIRED LAN INFRASTRUCTURE

CROSS-REFERENCE TO RELATED APPLICATION

This application claims the benefit of U.S. Provisional Patent Application No. 60/377,650, filed May 6, 2002, and is a continuation-in-part of a U.S. patent application entitled "Collaboration between Wireless LAN Access Points," filed Aug. 7, 2002, whose disclosure is incorporated herein by reference.

FIELD OF THE INVENTION

The present invention relates generally to local area network (LAN) communications, and specifically to methods and devices for improving the performance of wireless LANs.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1–2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer enormous communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point).

The natural response to these practical difficulties would be to distribute a greater number of access points within the area to be served. If a receiver receives signals simultaneously from two sources of similar strength on the same frequency channel, however, it is generally unable to decipher either signal. The 802.11 standard provides a mechanism for collision avoidance based on clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in high data-rate 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States actually have only three different frequency channels from which to choose. (In other countries, such as Spain, France and Japan, only one channel is available.) As a result, in complex, indoor environments, it becomes practically impossible to distribute wireless access points closely enough to give strong signals throughout the environment without substantial overlap in the coverage areas of different access points operating on the same frequency channel.

Access points in a WLAN system are typically interconnected by a wired LAN to communicate with a hub. The LAN serves as a distribution system (DS) for exchanging data between the access points and the hub. This arrangement enables the mobile stations to send and receive data through the access points to and from external networks, such as the Internet, via an access line connected to the hub.

Most commonly, the LAN used as a DS is an Ethernet LAN, operating in accordance with the Carrier Sense Multiple Access with Collision Detection (CSMA/CD) method of media access control (MAC) defined in IEEE Standard 802.3 (2000 Edition), which is incorporated herein by reference. The terms "Ethernet," "CSMA/CD" and "802.3" are used in the art interchangeably to refer to LANs of this type. Ethernet LANs are typically capable of carrying data at high speeds—greater than the aggregate speed of wireless communications between the access points and mobile stations. For example, a 100BASE-T Ethernet LAN is capable of carrying data over twisted pair cabling at 100 Mb/s. Message latency on the LAN is relatively high, however, generally on the order of milliseconds, due mainly to collision avoidance mechanisms specified by the 802.3 standard and the lack of a fragmentation mechanism at the 802.3 MAC layer. Another factor contributing to latency in Ethernet LANs is that the minimum frame size permitted by the standard is 64 bytes (plus 8 more bytes for the frame preamble and start frame delimiter), while the maximum frame size is more than 1500 bytes.

SUMMARY OF THE INVENTION

It is an object of some aspects of the present invention to provide methods and devices for enhancing the coverage and speed of WLAN systems.

It is a further object of some aspects of the present invention to provide methods and devices that enable a wired LAN to be used for high-speed, low-latency communications.

In preferred embodiments of the present invention, a WLAN system comprises multiple wireless access points distributed within a service region. The access points are linked together by cables in a local area network (LAN), typically an Ethernet LAN, which conveys data to and from mobile stations served by the access points. In order to provide complete coverage of the service region, with strong communication signals throughout the region, the access points are preferably closely spaced, and their areas of coverage may substantially overlap one another, unlike WLANs known in the art.

In order to deal with this overlap, the access points communicate among themselves using a novel, low-latency protocol over the LAN. When a mobile station sends an uplink message attempting to initiate communications in a given frequency channel, a number of access points operating in this frequency channel may typically receive the message. These access points arbitrate among themselves by sending messages over the LAN, using the novel protocol to determine which access point will respond to the mobile station. The arbitration must be completed promptly, typically well below 10 μs. If the access points were limited to communicating over the LAN using Ethernet protocols, they would be unable to complete the arbitration within this tight limit because of the high latency inherent in Ethernet, as described above. Therefore, each access point receiving the uplink message preempts its Ethernet communications immediately, and uses the novel protocol of the present invention instead to send and receive the messages necessary for arbitration. Standard Ethernet transmissions may resume afterwards.

The use of the arbitration mechanism of the present invention allows access points to be deployed within the service region as closely as desired while avoiding mutual interference. As a result, mobile stations everywhere in the service region experience good radio coverage, without "black holes," and can operate at optimal speed. Since the arbitration messaging among the access points takes advantage of an existing LAN among the access points (or a LAN that would be deployed as a DS for the WLAN in any case), the improved performance of the WLAN is achieved without substantial added hardware, by means of a very simple installation procedure.

Although preferred embodiments described herein are directed primarily to improving the coverage of WLAN systems, the principles of the present invention may be applied for other purposes, as well. Thus, the present invention may be employed to provide nodes in a LAN with dual MAC capabilities: a high-throughput MAC layer, such as a 100 Mb/s Ethernet MAC layer, used for general data communications; and a separate low-latency MAC layer, which is invoked when needed for sending short, high-priority messages, which are typically a microsecond or less in duration. The high-speed MAC can be used, for example, for synchronization and control signals that require low latency, and therefore cannot be carried over Ethernet. Ordinarily, in the absence of the low-latency MAC, additional cabling among the nodes would be required to carry these signals. The present invention resolves this deficiency of the prior art, allowing LAN cabling and equipment to be used for dual purposes.

There is therefore provided, in accordance with a preferred embodiment of the present invention, a method for mobile communication, including:

arranging a plurality of access points in a wireless local area network (WLAN) to communicate on a common frequency channel with a mobile station;

linking the access points together by cables in a wired local area network (LAN);

receiving at one or more of the access points an uplink signal transmitted over the WLAN by the mobile station on the common frequency channel;

sending one or more messages over the LAN among the access points, responsive to receiving the uplink signal;

arbitrating among the access points based on the messages so as to select one of the access points to respond to the uplink signal; and transmitting a response from the selected one of the access points to the mobile station.

Preferably, linking the access points includes arranging the access points to convey data to and from the mobile station via the LAN, in addition to sending the messages over the LAN responsive to receiving the uplink signal. Most preferably, arranging the access points to convey the data includes configuring the access points to convey the data in accordance with a first media access control (MAC) protocol characterized by a first latency, and sending the messages includes using a second MAC protocol, having a second latency lower than the first latency, to send the messages responsive to receiving the uplink signal. Typically, the first MAC protocol includes an Ethernet protocol.

Further preferably, sending the messages includes preempting conveying the data in accordance with the first MAC protocol in order to send the messages using the second MAC protocol. Typically, preempting conveying the data includes invoking a collision-avoidance mechanism provided by the first MAC protocol. Most preferably, preempting conveying the data includes interrupting transmission of a frame of the data in accordance with the first MAC protocol.

Preferably, sending the one or more messages includes sending broadcast messages from the access points receiving the uplink signal to the plurality of the access points.

Further preferably, arbitrating among the access points includes receiving and processing the messages at each of the plurality of the access points, so that each of the one or more of the access points receiving the uplink signal determines which one of the access points is to be selected to respond to the uplink signal. Most preferably, processing the messages includes selecting, responsive to the messages, the one of the access points that was first to receive the uplink signal.

Preferably, the access points have respective service areas, and wherein arranging the plurality of the access points includes arranging the access points so that the service areas substantially overlap.

In a preferred embodiment, arranging the plurality of the access points includes arranging the access points to communicate with the mobile station substantially in accordance with IEEE Standard 802.11, and arbitrating among the access points includes selecting the one of the access points to respond to the uplink signal within a time limit imposed by the IEEE Standard 802.11 for acknowledging the uplink signal.

There is also provided, in accordance with a preferred embodiment of the present invention, a method for network communication, including:

linking a plurality of nodes together in a local area network (LAN);

conveying data over the LAN among the nodes in accordance with a first media access control (MAC) protocol characterized by a first latency; and preempting conveying the data in accordance with the first MAC protocol in order to pass a message over the LAN among the nodes using a second MAC protocol, having a second latency lower than the first latency.

In a preferred embodiment, the first MAC protocol includes an Ethernet protocol, and preempting conveying the data includes asserting a signal in accordance with a media independent interface (MII) between physical and MAC layers of the Ethernet protocol.

Additionally or alternatively, preempting conveying the data includes invoking a collision-avoidance mechanism provided by the first MAC protocol.

Preferably, preempting conveying the data includes interrupting transmission of a frame of the data in accordance with the first MAC protocol.

Most preferably, conveying the data includes establishing a synchronization between the nodes on the LAN in accordance with the first MAC protocol, and preempting conveying the data includes using the established synchronization to send the message using the second MAC protocol.

Additionally or alternatively, conveying the data includes sending data frames including a first type of error detection code, and wherein preempting conveying the data includes sending the message with a second type of error detection code, different from the first type.

There is additionally provided, in accordance with a preferred embodiment of the present invention, a system for mobile communication, including:

cables arranged to form a wired local area network (LAN); and a plurality of access points interconnected by the LAN and arranged in a wireless local area network (WLAN) to communicate on a common frequency channel with a mobile station, the access points being adapted, upon receiving at one or more of the access points an uplink signal transmitted over the WLAN by the mobile station on the common frequency channel, to send one or more messages over the LAN among the access points, responsive to receiving the uplink signal, and to arbitrate among the access points based on the messages so as to select one of the access points to respond to the uplink signal, and to transmit a response from the selected one of the access points to the mobile station.

There is further provided, in accordance with a preferred embodiment of the present invention, a system for network communication, including:

cables arranged to form a wired local area network (LAN); and a plurality of nodes, which are linked together by the LAN and are adapted to convey data over the LAN among the nodes in accordance with a first media access control (MAC) protocol characterized by a first latency, and which are further adapted to preempt conveying the data in accordance with the first MAC protocol in order to pass a message over the LAN among the nodes using a second MAC protocol, having a second latency lower than the first latency.

There is moreover provided, in accordance with a preferred embodiment of the present invention, access point apparatus for deployment in a wireless local area network (WLAN) as one of a plurality of access points for mobile communication, the apparatus including:

a radio transceiver, which is configured to communicate on a predetermined frequency channel with a mobile station;

a physical layer interface, for connecting the access point to a wired local area network (LAN) interconnecting the access points; and processing circuitry, which is adapted, when the transceiver receives an uplink signal transmitted over the WLAN by the mobile station on the predetermined frequency channel, to send and receive messages via the physical layer interface over the LAN to and from the plurality of access points, and to arbitrate among the access points based on the messages so as to select one of the access points to respond to the uplink signal, and to control the transceiver so that the transceiver returns a response to the mobile station subject to the arbitration protocol.

Preferably, the processing circuitry is adapted to preempt conveying the data in accordance with the first MAC protocol in order to send the messages using the second MAC protocol. Most preferably, the processing circuitry includes a multiplexer, which is adapted invoke a collision-avoidance mechanism provided by the first MAC protocol in order to preempt conveying the data. Further preferably, the processing circuitry includes a MAC processor, which is adapted to generate frames of the data for transmission in accordance with the first MAC protocol, and the multiplexer is adapted to use the collision-avoidance mechanism in order to cause the MAC processor to interrupt transmission of one of the frames of the data.

There is furthermore provided, in accordance with a preferred embodiment of the present invention, node apparatus for deployment as one of a plurality of nodes in a local area network (LAN), the apparatus including:

a physical layer interface, for connecting the node to the LAN; and processing circuitry, which is adapted to convey data via the physical layer interface over the LAN in accordance with a first media access control (MAC) protocol characterized by a first latency, and which is further adapted to preempt conveying the data in accordance with the first MAC protocol in order to pass a message over the LAN using a second MAC protocol, having a second latency lower than the first latency.

Preferably, the processing circuitry includes:

a first MAC processor, for conveying the data in accordance with the first MAC protocol;

a second MAC processor, for sending and receiving the message in accordance with the second MAC protocol; and a multiplexer, coupling the first and second MAC processors to the physical layer interface, which is adapted to preempt the first MAC processor so as to enable the second MAC processor to send the message.

The present invention will be more fully understood from the following detailed description of the preferred embodiments thereof, taken together with the drawings in which:

BRIEF DESCRIPTION OF THE DRAWINGS

FIG. 5 is a flow chart that schematically illustrates a method for arbitrating among wireless access points in a WLAN system, in accordance with a preferred embodiment of the present invention.

DETAILED DESCRIPTION OF PREFERRED EMBODIMENTS

Figure 1:
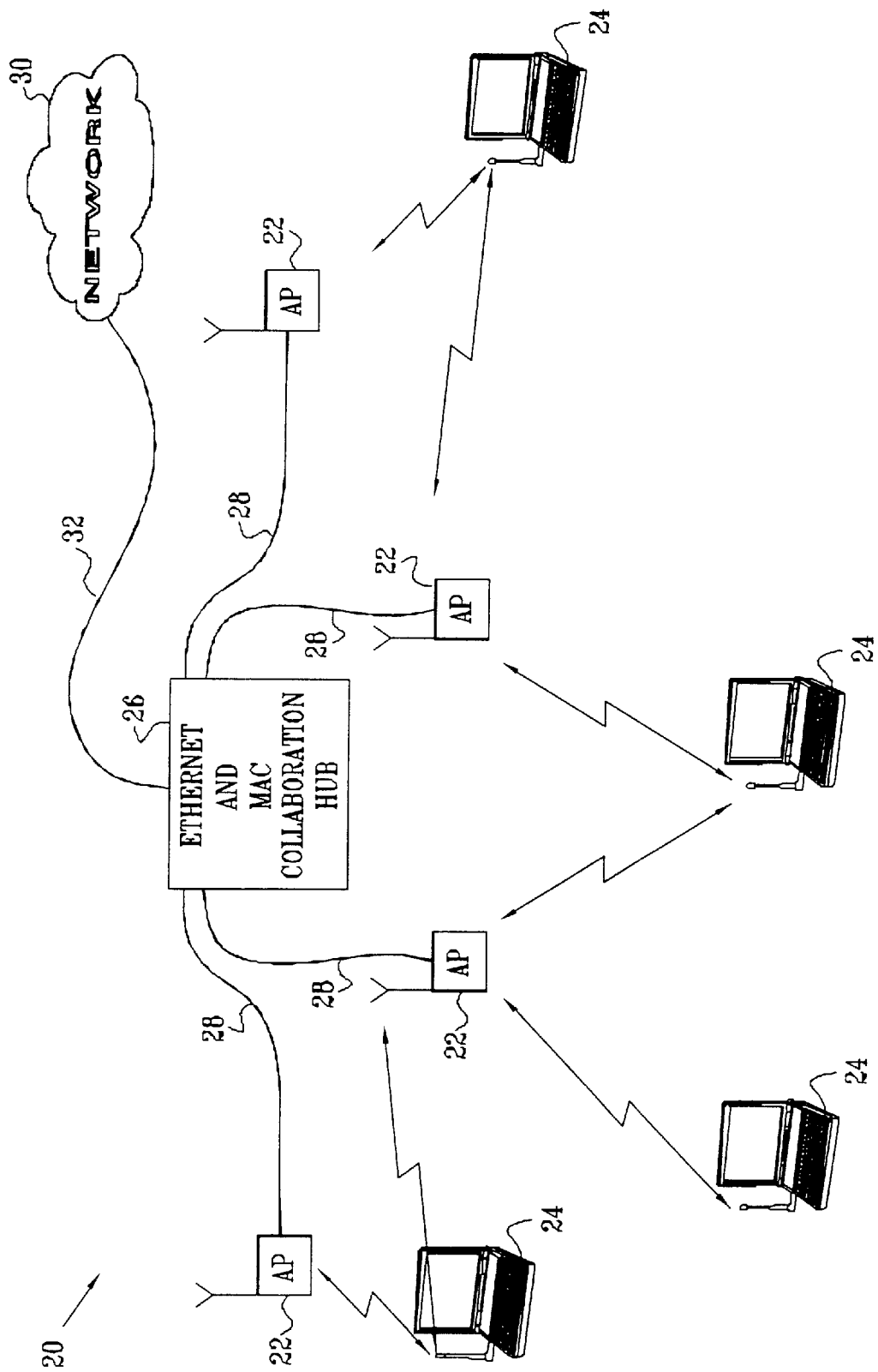
FIG. 1 is a block diagram that schematically illustrates a WLAN system, in accordance with a preferred embodiment of the present invention.

FIG. 1 is a block diagram that schematically illustrates a wireless LAN (WLAN) system 20, in accordance with a preferred embodiment of the present invention. System 20 comprises multiple access points 22, which are configured for data communication with mobile stations 24. The mobile stations typically comprise computing devices, such as desktop, portable or handheld devices, as shown in the figure. In the exemplary embodiments described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in Part 11: *Wireless LAN Medium Access Control (MAC) and Physical Layer (PHY) Specifications*, which is incorporated herein by reference. The principles of the present invention, however, are not limited to the 802.11 standards, and may likewise be applied to substantially any type of WLAN, including HiperLAN, Bluetooth and hiswan-based systems.

Access points 22 are connected to an Ethernet switching hub 26 by a wired LAN 28, which serves as the distribution system (DS) for exchanging data between the access points and the hub. As noted above, this arrangement enables mobile stations 24 to send and receive data through access points 22 to and from an external network 30, such as the Internet, via an access line 32 connected to hub 26. LAN 28 is typically a 100BASE-TX LAN, operating in half-duplex mode, as specified by the 802.3 standard. Alternatively, LAN 28 may comprise substantially any Ethernet standard LAN.

As described in the above-mentioned U.S. patent application ("Collaboration between Wireless LAN Access Points"), access points 22 in system 20 are preferably closely spaced, so that radio waves may typically reach mobile station 24 from multiple access points simultaneously on the same frequency channel. By the same token, radio messages transmitted by mobile station 24 may be received at about the same time by multiple access points. In WLAN systems known in the art, under these circumstances, mobile station 24 would receive downlink messages from two or more of the access points, which would probably result in inability of the mobile station to communicate with any of the access points. In preferred embodiments of the present invention, the access points collaborate to resolve this conflict by exchanging arbitration messages with one another using a novel, high-speed protocol over LAN 28, as described hereinbelow. Preferably, the arbitration messages are broadcast by all the access points that receive an uplink signal from a given mobile station, to all the other access points. Based on the arbitration messages, the access points decide which access point is to serve a given mobile station (usually the closest access point to the mobile station, meaning the first access point to send out an arbitration message over LAN 28 in response to a given uplink message). The other access points meanwhile refrain from interfering.

Ordinarily, in a conventional WLAN, when an access point receives an uplink message from a mobile station, it answers immediately with an acknowledgment (ACK). If the mobile station does not receive the ACK within a given timeout period (known as the interframe space, or IFS), typically 10 $\mu$s, it subsequently submits an automatic repeat request (ARQ). Ultimately, the mobile station will treat the message exchange as having failed if it repeatedly does not receive the required ACK. Therefore, to maintain 802.11 compatibility in system 20, one—and only one—of the receiving access points must return an ACK to mobile station 24 within the 10 $\mu$s limit. This constraint requires that the arbitration process among the access points be completed in substantially less than 10 $\mu$s. For this purpose, access points 22 are provided with dual MAC functions: an Ethernet MAC for conventional data communications, and a novel low-latency MAC for arbitration, as described below.

Figure 2:
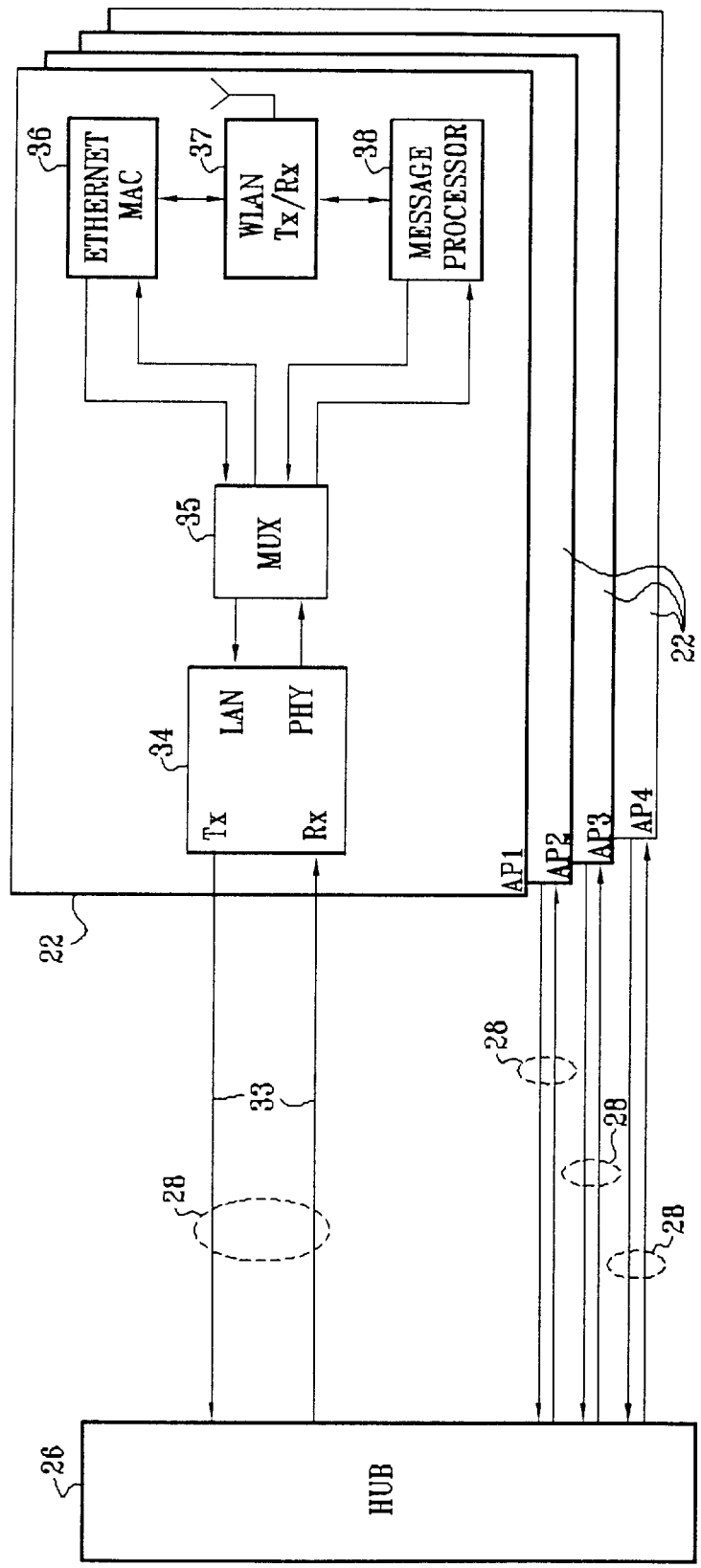
FIG. 2 is a block diagram that schematically shows details of access points in a WLAN system, in accordance with a preferred embodiment of the present invention.

FIG. 2 is a block diagram that schematically shows details of access points 22, in accordance with a preferred embodiment of the present invention. Access point 22 is connected to hub 26 by wires 33 of LAN 28. Hub 26 typically comprises a standard Ethernet switching hub, as is known in the art, which is additionally programmed to recognize and rapidly switch the (non-Ethernet) arbitration messages exchanged among the access points. Access point 22 comprises a physical layer interface (PHY) 34, which transmits and receives signals over wires 33 in accordance with the 100BASE-TX PHY layer specification of the 802.3 standard. Preferably, PHY 34 operates in a half-duplex mode, as provided by the standard.

A multiplexer 35 attaches PHY 34 to two different MAC processors: an Ethernet frame processor 36 and a collaboration message processor 38. As a rule, the multiplexer gives priority to delivering outgoing arbitration messages from the message processor, blocking the frame processor and preempting any transmission of pending Ethernet frames in the meanwhile. Based on these arbitration messages, processor 38 interacts with and controls a WLAN transceiver 37. Transceivers 37 communicate over the air with mobile stations 24 in accordance with the applicable WLAN standard.

The elements of access point 22 shown in FIG. 2 may comprise individual, separate components, or they may alternatively be combined together in a single integrated circuit chip or chip set. Although multiplexer 35 and message processor 38 are novel and unique to the present invention, the other elements of the access point shown in FIG. 2 (including PHY 34, Ethernet frame processor 36 and transceiver 37) are available off-shelf as standard components. The multiplexer, Ethernet frame processor and message processor may also be implemented as software processes running on a single microprocessor, as long as the processing speed of the microprocessor is sufficient.

Figure 3:
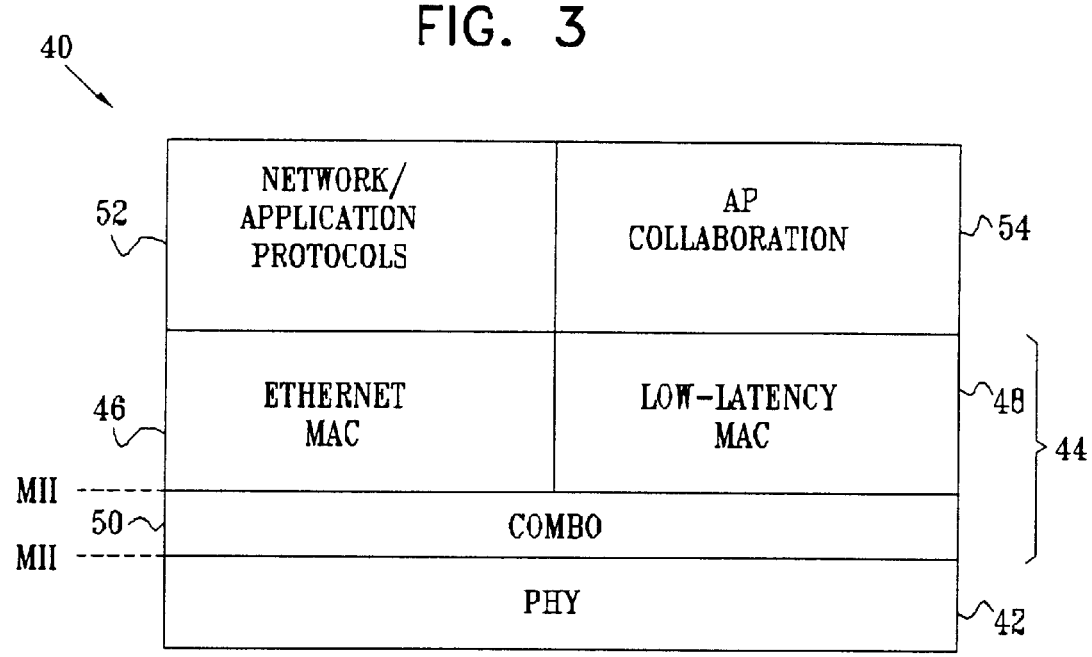
FIG. 3 is a block diagram that schematically illustrates a communication protocol stack with dual MAC layers, in accordance with a preferred embodiment of the present invention.

FIG. 3 is a block diagram that schematically illustrates a protocol stack implemented by the components of access point 22, in accordance with a preferred embodiment of the present invention. PHY 34 implements a standard physical layer protocol 42, in accordance with the 802.3 standard, such as the 100BASE-TX protocol. The functions of a MAC protocol layer 44, however, are divided among several components. Ethernet frame processor 36 implements a standard 802.3 MAC protocol 46. Message processor 38, on the other hand, uses a novel low-latency MAC protocol 48 for arbitration messaging among the access points. A combination (COMBO) layer 50 is provided by multiplexer 35 to interface between the physical layer protocol and the alternative MAC protocols.

Preferably, COMBO layer 50 uses a Machine-Independent Interface (MII) to interface with the physical and Ethernet MAC layers, and optionally with low-latency MAC 48, as well. The MII, as defined in detail in Chapter 22 of the 802.3 standard, provides standard primitives for communication between the Ethernet MAC layer and the 100BASE-TX PHY layer. By using these primitives in the manner provided by the 802.3 standard, the operation of COMBO layer 50 is transparent to the Ethernet MAC and PHY layers. In other words, these layers operate in the conventional fashion, and need not be modified to accommodate low-latency MAC 48.

At a higher protocol level, network and application layers 52 are responsible for conveying data to and from mobile stations 24 between WLAN transceiver 37 and LAN 28. These conventional functions are beyond the scope of the present invention, and their implementation will be apparent to those skilled in the art.

An access point collaboration layer 54 is responsible for generating arbitration messages to be transmitted over LAN 28 via high-speed MAC layer 48 and for receiving and processing incoming arbitration messages from other access points. Layer 54 uses the arbitration message information to determine which of the access points should respond to a given uplink message received by transceiver 37 and outputs control signals to the transceiver accordingly. These operations, and associated details of the operation of low-latency MAC layer 48 and COMBO layer 50, are described further hereinbelow with reference to FIG. 5.

Figure 4:
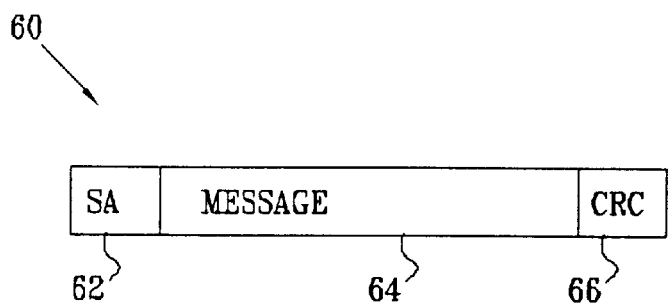
FIG. 4 is a block diagram that schematically illustrates a message packet exchanged between access points in a WLAN system, in accordance with a preferred embodiment of the present invention.

FIG. 4 is a block diagram that schematically illustrates a broadcast packet 60 sent over LAN 28 by one of access points 22, in accordance with a preferred embodiment of the present invention. Packet 60 is used by the access points to convey arbitration messages to the other access points upon receiving uplink communications from one of mobile stations 24, as described below with reference to FIG. 5. The packet comprises a source address (SA) 62, a message body 64 and an error checking code 66, typically a cyclic redundancy code (CRC), as is known in the art.

For rapid communications between the access points, it is desirable that packet 60 be as short as possible, most preferably no more than 16 bits. Thus, SA 62 simply identifies the sending access point, in a unique, proprietary format, which also allows hub 26 to recognize the packet as a broadcast packet. Since the hub distributes the packet to all the access points, there is no need for a destination address. Hub 26 not only has the capabilities of a standard Ethernet switching hub, but also has added hardware and software capabilities that enable it to recognize packet 60 and distribute it with highest priority. For this purpose, hub 26 preferably includes dedicated broadcast circuitry, since otherwise the standard 802.3 switching circuits would regard packet 60 as erroneous and would therefore drop it. Most preferably, hub 26, like access point 22, has an added a buffer layer between the standard PHY layer and two different MAC layers: the standard 802.3 switching MAC and the novel low-latency broadcast MAC of the present invention. Since 100BASE-TX uses synchronous links ("always on"), hub 26 preferably includes an elastic buffer (not shown) for use in broadcasting packet 60 from one input port to many output ports in parallel.

Message body 64 identifies the mobile station that sent the uplink message reported by packet 60. For efficient communications, the mobile station identification is abridged, by hashing to a 16-bit code, for example. Message processor 38 in each of the access points receiving packet 60 decodes SA 62 and message body 64. The message processor thus resolves the identities of both the mobile station that sent the uplink message and the access point that received the uplink message and issued packet 60. Based on the contents of packets that it receives and the times at which it receives them, the message processor decides whether this access point should respond to the uplink message. Typically, the first access point to send out a broadcast packet in response to a given uplink message is chosen to respond to the message. Optionally, message body 64 may include other parameters, such as the power level of the received uplink message and/or an identification of the antenna on which the access point received the message. (For diversity purposes, access points generally have multiple antennas.) These additional parameters may be used, in addition to or instead of the time of receipt of packet 60, in arbitrating among the access points.

Code 66 is preferably an 8- or 16-bit CRC, which is used by message processor 38 to verify the correctness of the contents of packet 60. Most preferably, code 66 uses a different coding scheme from that provided by the 802.3 standard. As a result, if packet 60 is accidentally passed to Ethernet MAC processor 36, the Ethernet MAC layer will be unable to correctly decode the CRC and will therefore discard the packet.

FIG. 5 is a flow chart that schematically illustrates a method for establishing communications between mobile station 24 and one of access points 22 in system 20, in accordance with a preferred embodiment of the present invention. Further details of this method are described in the above-mentioned U.S. patent application (which uses a dedicated, shared medium to exchange arbitration messages between the access points, rather than LAN 28). Access points 22 transmit beacon signals on their common frequency channel, giving the time base with which the mobile station should synchronize its communications and indicating the BSS identification (BSSID) of the access point. In 802.11 WLAN systems known in the art, each access point has its own unique BSSID. In system 20, however, multiple access points share the same BSSID, so that they appear logically to the mobile station to be a single, extended, distributed access point, which has multiple antennas at different locations. The time bases of the access points are mutually synchronized using synchronization messages sent over LAN 28 (in the form of packet 60), and the beacon signals transmitted by the access points are interlaced to avoid collision between them.

When mobile station 24 receives a beacon signal of sufficient strength, it extracts the BSSID and time base from the signal, and uses them to send an uplink message, which is received by one or more of the access points, at an uplink step 70. The actions of the mobile station in this and other steps are completely in accordance with the 802.11 standard. In other words, the present invention can be implemented in a manner that is by definition transparent to and requires no modification of existing mobile stations. Typically, the first uplink signal sent by the mobile station is an association request message that is addressed to the BSSID and indicates the MAC address of the mobile station. Following this uplink message, one—and no more than one—of the receiving access points must return an ACK to mobile station 24 within the 10 µs IFS limit, as explained above.

To determine which of the access points will respond to the association request message, access points 22 carry out an arbitration procedure using LAN 28. For this purpose, message processors 38 in all access points that received the uplink message from mobile station 24 prepare broadcast packets 60, at a packet generation step 72, in order to give notice to the other access points that they have received an uplink message. High-speed MAC layer 48 notifies COMBO layer that it has a packet ready to transmit, preferably by setting a transmit enable flag. For example, assuming the high-speed MAC and COMBO layers communicate in accordance with the MII defined by the 802.3 standard, the high-speed MAC layer asserts the TX_EN signal synchronously with the first nibble of the transmitted packet. It continues to assert this flag until the entire packet has been transmitted.

As soon as low-latency MAC layer 48 of message processor 38 notifies COMBO layer 50 of multiplexer 35 that it has a packet to transmit, the COMBO layer immediately breaks off any Ethernet communications by access point 22, at an Ethernet blocking step 74. Preferably, the COMBO layer notifies Ethernet MAC layer 46 that a collision has been detected on the LAN, by asserting the COL signal provided by the MII of the 802.3 standard. When such a collision condition occurs, the Ethernet MAC layer terminates transmission of any frames in progress, and defers further transmissions as long as the COL flag remains asserted. If the COMBO layer was in the process of transmitting an Ethernet frame, it immediately stops transmission and requests that PHY layer 42 deliberately corrupt the contents of the frame in such a manner that a receiver will detect the corruption with the highest degree of probability. For this purpose, the COMBO layer preferably asserts the TX_ER and TX_EN signals, as provided by the MII, on its interface with the PHY layer. In response, as specified in section 22.2.2.8 of the 802.3 standard, the PHY layer will emit one or more symbols that are not part of the valid data or delimiter set provided by the standard. These symbols will cause all receivers of the frames to immediately discard them.

After asserting the COL and TX_ER flags (preferably for no more than one clock period), COMBO layer 50 transmits the broadcast message prepared by low-latency MAC layer 48, at a broadcast transmission step 76. The COMBO layer preferably asserts the TX_EN flag in order to instruct PHY layer 42 to transmit the packet. Even when the PHY layer is idle, it continues to transmit and receive idle symbols over LAN 28 in order to maintain synchronization, as mandated by the 802.3 standard. Therefore, there is essentially no synchronization delay involved in beginning to send or receive an arbitration broadcast packet over the LAN.

All access points 22 receive the broadcast packets sent over LAN 28, at a message reception step 78. When COMBO layer 50 receives one of the broadcast packets, it passes the packet immediately to low-latency MAC layer 48. The MAC layer passes the message information to collaboration layer 54, which arbitrates among the access points that sent broadcast packets, at an arbitration step 80, in order to determine which access point will respond to the uplink message received at step 70. The same arbitration takes place at all the access points. Each access point is able to determine whether it was first to send its message, or whether another access point preceding it, by comparing the time of receipt of these broadcast messages to the time at which the access point sent its own broadcast message. (Access points operating on other frequency channels, as well as access points on the same frequency channel that did not receive an uplink signal from the mobile station identified in the broadcast message, may ignore the message.)

Typically, the access point that was able to send its broadcast message first in response to an uplink message from a given mobile station is in a good position to continue communications with the mobile station. Therefore, all the access points independently choose this first access point to respond to mobile station 24. The 802.11 standard supports a large range of data rates for transmission (1 to 54 Mb/s). The mobile station tries to transmit packets as fast as possible, link permitting. Therefore, in general, only the access points that are close enough to the mobile station to receive the high-rate transmission will be in contention to serve the mobile station, and the winning access point must implicitly be among the best receivers of the uplink message in question.

Alternatively or additionally, other criteria, such as received signal power, may be applied in choosing the "winning" access point, as long as the criteria are applied uniformly by all the access points. Preferably, if a deadlock occurs (such as when two access points send their broadcast messages at the same instant), a predetermined formula, which may be based on the received signal power, is applied by all the access points to resolve the deadlock uniformly.

The winning access point sends the required ACK message to mobile station 24, at an acknowledgment step 82. As noted above, the ACK must be sent within a short time, typically b 10µs, and steps 70–80 must all be completed within this time. Access points 22 are able to meet this time constraint by using LAN 28 in the manner described above. After sending the ACK, the winning access point typically sends an association response message to mobile station 24, and then continues its downlink transmission to the mobile station as appropriate.

The winning access point continues serving the mobile station until the mobile station sends another uplink message. The arbitration protocol described above is then repeated. A different access point may be chosen to serve the mobile station in the next round, particularly if the mobile station has moved in the interim. Even if the mobile station has moved, there is no need to repeat the association protocol. As noted above, all the access points belong to the same BSS, as though they were a single extended access point. Therefore, the same association of the mobile station is therefore maintained even if the arbitration process among the access points chooses a different "winner" to respond to the next uplink packet from the mobile station.

The LAN communication architecture shown in FIG. 2 and the protocol stack shown in FIG. 3 are useful not only in improving the coverage of WLAN systems, as described above, but also in other network communication contexts. As noted above, the present invention may thus be employed to provide nodes in a LAN with dual MAC capabilities: a medium-latency MAC layer, such as an Ethernet MAC layer, used for general data communications; and a separate low-latency MAC layer, which is invoked when needed for sending short, urgent messages. Low-latency MAC layer 48 can be used, for example, for synchronization and control signals that require low latency, and therefore cannot be accommodated by Ethernet MAC layer 46. The high-speed MAC and COMBO layers of the present invention can similarly be used in a dual-MAC configuration alongside other types of MAC and data link protocol layers known in the art. For example, the low-latency MAC layer could be used in a real-time location system, to use multiple radio propagation measurements to locate people in an office building or plant.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for network communication, comprising:

linking a plurality of nodes together in a local area network (LAN);

conveying data over the LAN among the nodes in accordance with a first media access control (MAC) protocol characterized by a first latency; and preempting conveying the data in accordance with the first MAC protocol in order to pass a message over the LAN among the nodes using a second MAC protocol, having a second latency lower than the first latency, wherein the first MAC protocol comprises an Ethernet protocol, and wherein preempting conveying the data comprises asserting a signal in accordance with a media independent interface (MII) between physical and MAC layers of the Ethernet protocol.

2. A method according to claim 1, wherein preempting conveying the data comprises invoking a collision-avoidance mechanism provided by the first MAC protocol.

3. A method according to claim 1, wherein preempting conveying the data comprises interrupting transmission of a frame of the data in accordance with the first MAC protocol.

4. A method for network communication, comprising:

linking a plurality of nodes together in a local area network (LAN);

conveying data over the LAN among the nodes in accordance with a first media access control (MAC) protocol characterized by a first latency; and preempting conveying the data in accordance with the first MAC protocol in order to pass a message over the LAN among the nodes using a second MAC protocol, having a second latency lower than the first latency, wherein conveying the data comprises establishing a synchronization between the nodes on the LAN in accordance with the first MAC protocol, and wherein preempting conveying the data comprises using the established synchronization to send the message using the second MAC protocol.

5. A method for network communication, comprising:

linking a plurality of nodes together in a local area network (LAN):

conveying data over the LAN among the nodes in accordance with a first media access control (MAC) protocol characterized by a first latency; and preempting conveying the data in accordance with the first MAC protocol in order to pass a message over the LAN among the nodes using a second MAC protocol, having a second latency lower than the first latency.

wherein conveying the data comprises sending data frames including a first type of error detection code, and wherein preempting conveying the data comprises sending the message with a second type of error detection code, different from the first type.

6. A system for network communication, comprising:

cables arranged to form a wired local area network (LAN); and a plurality of nodes, which are linked together by the LAN and are adapted to convey data over the LAN among the nodes in accordance with a first media access control (MAC) protocol characterized by a first latency, and which are further adapted to preempt conveying the data in accordance with the first MAC protocol in order to pass a message over the LAN among the nodes using a second MAC protocol, having a second latency lower than the first latency, wherein the first MAC protocol comprises an Ethernet protocol, and wherein the nodes are adapted to preempt conveying the data by asserting a signal in accordance with a media independent interface (MII) between physical and MAC layers of the Ethernet protocol.

7. A system according to claim 6, wherein the nodes are adapted to preempt conveying the data by invoking a collision-avoidance mechanism provided by the first MAC protocol.

8. A system according to claim 6, wherein the nodes are adapted to preempt conveying the data by interrupting transmission of a frame of the data in accordance with the first MAC protocol.

9. A system for network communication comprising:

cables arranged to form a wired local area network (LAN); and a plurality of nodes, which are linked together by the LAN and are adapted to convey data over the LAN among the nodes in accordance with a first media access control MAC protocol characterized by a first latency, and which are further adapted to preempt conveying the data in accordance with the first MAC protocol in order to pass a message over the LAN among the nodes using a second MAC protocol, having a second latency lower than the first latency, wherein the nodes are adapted to establish a synchronization between the nodes on the LAN in accordance with the first MAC protocol, and to use the established synchronization to send the message using the second MAC protocol.

10. A system for network communication, comprising:

cables arranged to form a wired local area network (LAN); and a plurality of nodes, which are linked together by the LAN and are adapted to convey data over the LAN among the nodes in accordance with a first media access control (MAC) protocol characterized by a first latency, and which are further adapted to preempt conveying the data in accordance with the first MAC protocol in order to pass a message over the LAN among the nodes using a second MAC protocol, having a second latency lower than the first latency, wherein the nodes are adapted to convey the data by sending data frames including a first type of error detection code, and to send the message with a second type of error detection code, different from the first type.

11. Access point apparatus deployment in a wireless local area network (WLAN) as one of a plurality of access points for mobile communication, the apparatus comprising:

a radio transceiver, which is configured to communicate on a predetermined frequency channel with a mobile station;

a physical layer interface, for connecting the access point to a wired local area network (LAN) interconnecting the access points; and processing circuitry, which is adapted, when the transceiver receives an uplink signal transmitted over the WLAN by the mobile station on the predetermined frequency channel, to send and receive messages via the physical layer interface over the LAN to and from the plurality of access points, and to arbitrate among the access points based on the messages so as to select one of the access points to respond to the uplink signal, and to control the transceiver so that the transceiver returns a response to the mobile station subject to the arbitration protocol, wherein the processing circuitry is further adapted to convey data to an from the mobile station over the LAN via the physical layer interface, in addition to sending and receiving the messages over the LAN responsive the uplink signal, and wherein the processing circuitry is adapted to convey the data in accordance with a first media access control (MAC) protocol characterized by a first latency, and to send and receive the messages responsive to receiving the uplink signal using a second MAC protocol, having a second latency lower than the first latency, and wherein the processing circuitry is adapted to preempt conveying the data in accordance with the first MAC protocol in order to send the messages using the second MAC protocol, and wherein the processing circuitry comprises a multiplexer, which is adapted invoke a collision-avoidance mechanism provided by the first MAC protocol in order to preempt conveying the data.

12. Apparatus according to claim 11, wherein the processing circuitry comprises a MAC processor, which is adapted to generate frames of the data for transmission in accordance with the first MAC protocol, and wherein the multiplexer is adapted to use the collision-avoidance mechanism in order to cause the MAC processor to interrupt transmission of one of the frames of the data.

13. Apparatus according to claim 11, wherein the messages sent and received by the processing circuitry responsive to receiving the uplink signal comprise broadcast messages, sent from the access points receiving the uplink signal to the plurality of the access points.

14. Apparatus according to claim 11, wherein the processing circuitry is adapted to receive and process the messages so that each of the one or more of the access points receiving the uplink signal determines which one of the access points is to be selected to respond to the uplink signal.

15. Apparatus according to claim 14, wherein the processing circuitry is adapted to select, responsive to the messages, the one of the access points that was first to receive the uplink signal.

16. Apparatus according to claim 11, wherein the transceiver is adapted to communicate with the mobile station substantially in accordance with IEEE Standard 802.11.

17. Apparatus according to claim 16, wherein the processing circuitry is adapted to select the one of the access points to respond to the uplink signal within a time limit imposed by the IEEE Standard 802.11 for acknowledging the uplink signal.

18. Node apparatus for deployment as one of a plurality of nodes in a local area network (LAN), the apparatus comprising:

a physical layer interface, for connecting the node to the LAN; and processing circuitry, which is adapted to convey data via the physical layer interface over the LAN in accordance with a first media access control (MAC) protocol characterized by a first latency, and which is further adapted to preempt conveying the data in accordance with the first MAC protocol in order to pass a message over the LAN using a second MAC protocol, having a second latency lower than the first latency, wherein the first MAC protocol comprises an Ethernet protocol, and wherein the processing circuitry comprises:
a first MAC processor, for conveying the data in accordance with the first MAC protocol;
a second MAC processor, for sending and receiving the message in accordance with the second MAC protocol; and
a multiplexer, coupling the first and second MAC processors to the physical layer interface, which is adapted to preempt the first MAC processor so as to enable the second MAC processor to send the message.

19. Apparatus according to claim 18, wherein the first MAC protocol comprises an Ethernet protocol, and wherein the multiplexer is adapted to preempt the first MAC processor by asserting a signal in accordance with a media independent interface (MII) between physical and MAC layers of the Ethernet protocol.

20. Apparatus according to claim 18, wherein the multiplexer is adapted to preempt the first MAC processor by invoking a collision-avoidance mechanism provided by the first MAC protocol.

21. Apparatus according to claim 18, wherein the multiplexer is adapted, upon preempting the first MAC processor, to interrupt transmission of a frame of the data generated by the first MAC processor.

22. Apparatus according to claim 18, wherein the first MAC processor is adapted to generate data frames including a first type of error detection code, and wherein the second MAC processor is adapted to generate the message with a second type of error detection code, different from the first type.

23. Node apparatus for deployment as one of a plurality of nodes in a local area network (LAN), the apparatus comprising:

a physical layer interface, for connecting the node to the LAN; and processing circuitry, which is adapted to convey data via the physical layer interface over the LAN in accordance with a first media access control (MAC) protocol characterized by a first latency, and which is further adapted to preempt conveying the data in accordance with the first MAC protocol in order to pass a message over the LAN using a second MAC protocol, having a second latency lower than the first latency, wherein the first MAC protocol comprises an Ethernet protocol, and wherein the physical layer interface is adapted to establish a synchronization between the nodes on the LAN in accordance with the first MAC protocol, and to use the established synchronization to send the message using the second MAC protocol.

* * * * *